United States Patent
Caillot et al.

(10) Patent No.: US 10,518,752 B2
(45) Date of Patent: Dec. 31, 2019

(54) WASHING FLUID SPRAY DEVICE FOR A WIPER ARM FOR A SYSTEM FOR WIPING A WINDOW OF A MOTOR VEHICLE

(71) Applicant: Valeo Systèmes d'Essuyage, Le Mesnil Saint Denis (FR)

(72) Inventors: Gérald Caillot, Cernay la Ville (FR); Sébastien Rollet, Aigueperse (FR); Philippe Picot, Les Ancizes Comps (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 164 days.

(21) Appl. No.: 14/962,544

(22) Filed: Dec. 8, 2015

(65) Prior Publication Data

US 2016/0159325 A1   Jun. 9, 2016

(30) Foreign Application Priority Data

Dec. 9, 2014   (FR) ..................................... 14 62090

(51) Int. Cl.
*B60S 1/34*   (2006.01)
*B60S 1/52*   (2006.01)

(52) U.S. Cl.
CPC ............. *B60S 1/3429* (2013.01); *B60S 1/522* (2013.01)

(58) Field of Classification Search
CPC ....................................................... B60S 1/522
USPC ....................................................... 15/250.04
See application file for complete search history.

(56) References Cited

U.S. PATENT DOCUMENTS

| | | | | |
|---|---|---|---|---|
| 3,147,508 A | * | 9/1964 | Glynn ................... | B60S 1/4006 15/250.32 |
| 4,782,547 A | * | 11/1988 | Mohnach .............. | B60S 1/0408 15/250.04 |
| 5,842,251 A | * | 12/1998 | LeFrançois et al. .. | B60S 1/3497 15/250.04 |
| 5,903,953 A | * | 5/1999 | Dimur ...................... | B60S 1/32 15/250.04 |
| 6,094,772 A | | 8/2000 | West | |
| 2003/0009841 A1 | * | 1/2003 | Sato ...................... | B60S 1/3415 15/250.04 |
| 2009/0113653 A1 | * | 5/2009 | Thienard ................. | B60S 1/386 15/250.32 |
| 2013/0139342 A1 | * | 6/2013 | Egner-Walter .......... | B60S 1/524 15/250.04 |

FOREIGN PATENT DOCUMENTS

| | | |
|---|---|---|
| CN | 2764679 Y | 3/2006 |
| CN | 102089193 A | 6/2011 |
| CN | 102470827 A | 5/2012 |
| DE | 19826846 C1 | 3/2000 |

(Continued)

OTHER PUBLICATIONS

FR2761323A1 (machine translation), 1998.*

(Continued)

*Primary Examiner* — Andrew A Horton
(74) *Attorney, Agent, or Firm* — Osha Liang LLP

(57) ABSTRACT

A washing fluid spray device for a wiper arm for a system for wiping a window of a motor vehicle is disclosed. The device includes a cowling intended to cover a support yoke of a wiper arm and also a washing fluid spray nozzle that is held in a removable manner by the cowling.

18 Claims, 4 Drawing Sheets

Fig.1

(56) References Cited

FOREIGN PATENT DOCUMENTS

Figure 1:
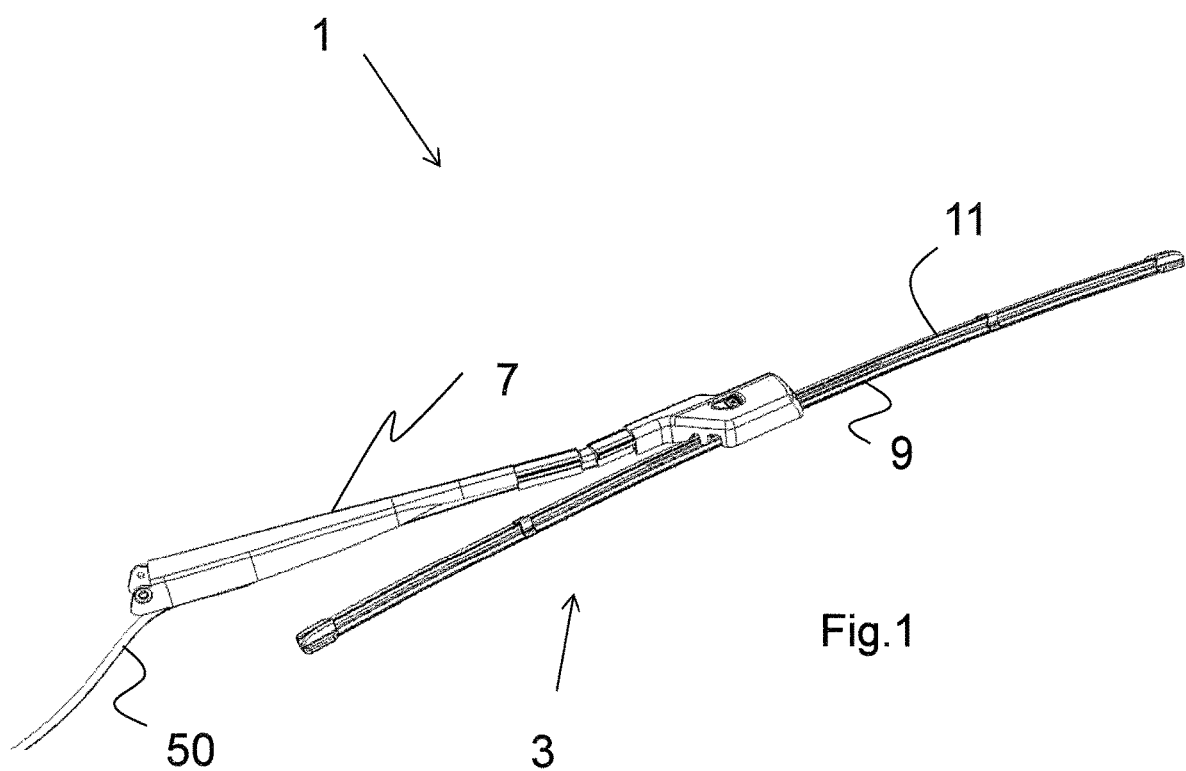

| DE | 102004007351 A1 | 9/2005 |
| DE | 10 2010 007557 A1 | 8/2011 |
| DE | 102010064178 A1 | 6/2012 |
| DE | 102012224474 A1 | 7/2014 |
| FR | 2761323 A1 * | 10/1998 | ............. B60S 1/524 |
| FR | 2859963 A1 | 3/2005 |
| FR | 2902063 A1 | 12/2007 |
| JP | 2002-523295 A | 7/2002 |
| JP | 2002-321599 A | 11/2002 |
| JP | 2002-537169 A | 11/2002 |
| JP | 2007-276669 A | 10/2007 |

OTHER PUBLICATIONS

The First Office Action issued in corresponding Chinese Application No. 201510895430.9, dated Aug. 11, 2017 (17 pages).
Preliminary Search Report issued in corresponding French Application No. FR1462090, dated Dec. 9, 2014 (6 pages).
Notice of Reason for Rejection in corresponding Japanese Application No. 2015/239396, dated Aug. 30, 2019 (9 pages).

* cited by examiner

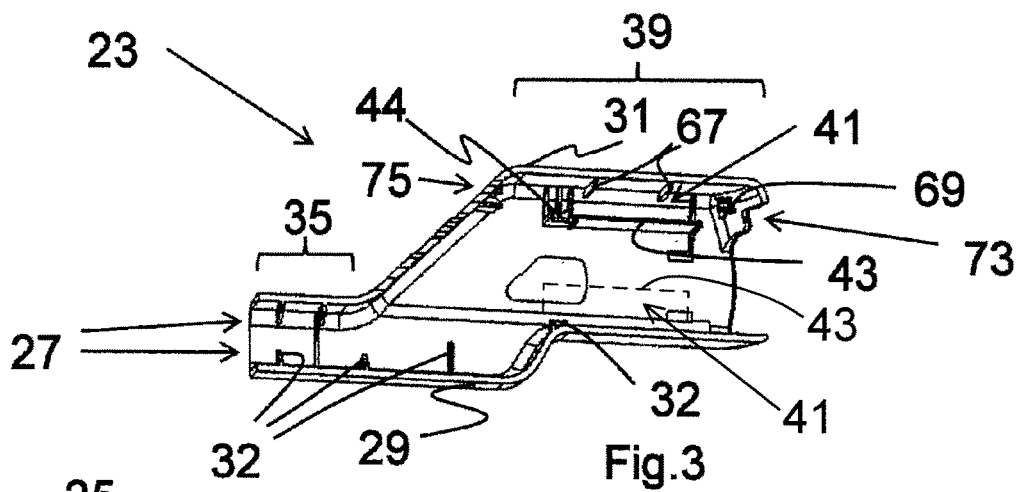
Fig.3
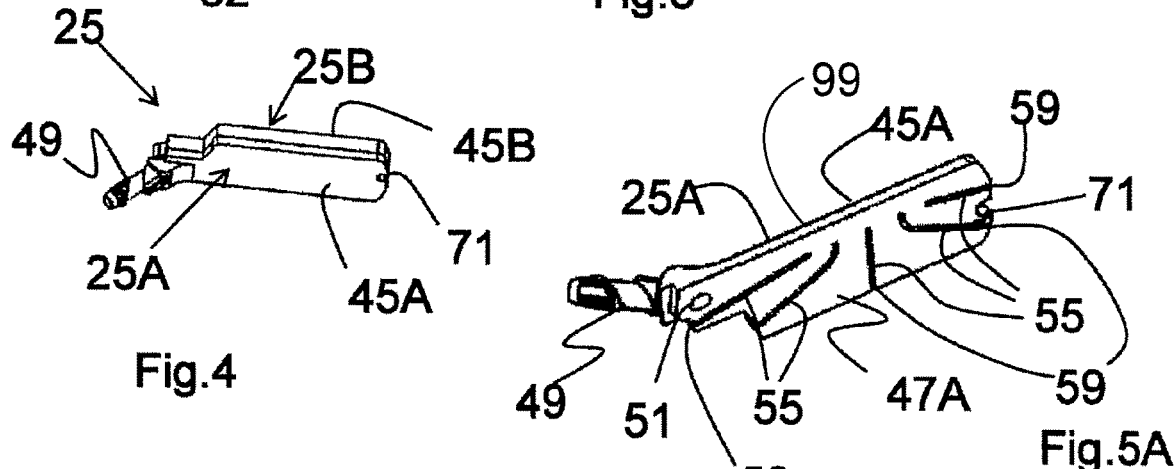
Fig.4
Fig.5A
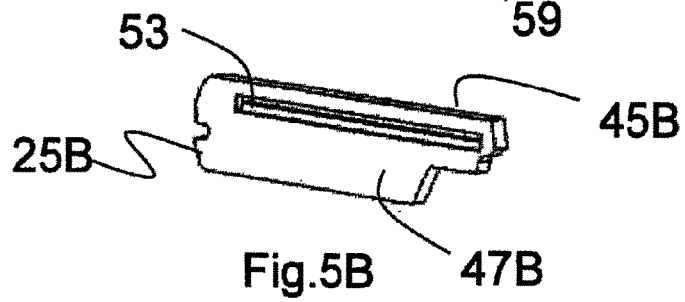
Fig.5B
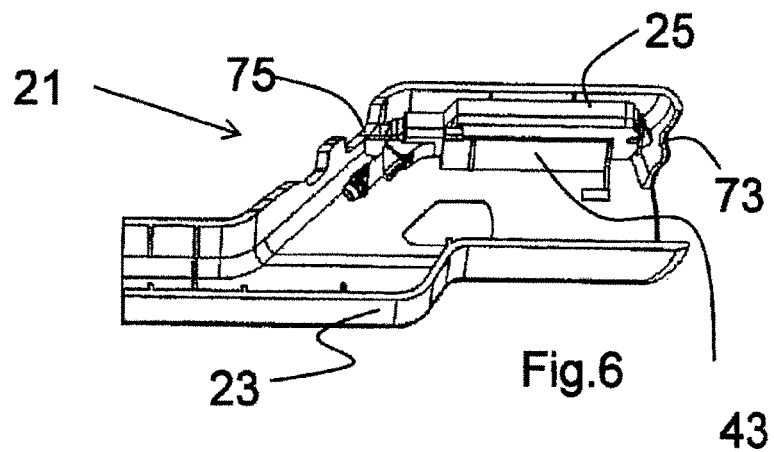
Fig.6

WASHING FLUID SPRAY DEVICE FOR A WIPER ARM FOR A SYSTEM FOR WIPING A WINDOW OF A MOTOR VEHICLE

The present invention relates to a washing fluid spray device for a wiper arm for a system for wiping a window of a motor vehicle, to a wiper arm for a wiping system and to a wiping system.

In order to ensure proper cleaning of a window, it is essential to spray a washing fluid upstream of the wiping blade.

To this end, spraying nozzles disposed on the body of a vehicle, which spray screen wash fluid onto the window to be cleaned, are known. However, the sprayed jet is often aimed only at a single impact zone, such that the washing fluid does not act uniformly over the entire surface to be cleaned.

Also known are wiper arms which are equipped with nozzles for spraying a washing fluid. In this case, one or more washing jets are generally sprayed onto the window in a general direction perpendicular to the plane defined by the window and just upstream of the wiping blade.

In order to improve the washing fluid spraying situation, wiper arms equipped with nozzles for laterally spraying a washing fluid are also known. The documents DE102010064178, FR2859963, U.S. Pat. No. 6,094,772, JP2002321599 or DE19826846 can be cited for example.

However, in some of these documents, the nozzles are an integral part of the arm such that the arm cannot be made in a modular fashion so as to be able to offer constructors arms with or without spraying nozzles.

The document DE102004007351 describes a wiper arm in which spraying nozzles are integrated into a specific yoke with a laterally offset portion. This modification of the yoke is not desirable given that it results in a significant modification of the structural performance of the yoke, in particular in terms of mechanical integrity.

In addition, it requires the provision, when being mounted on the assembly line, of two different yokes for one and the same type of wiper arm, and this can be a source of error.

Furthermore, it has been found that users all too often use tap water as washing fluid. In hard water regions, this can cause problems when the nozzles are blocked by scale. Specifically, faced with such a fault, a mechanic might propose replacing the entire wiper arm, even though it is only the nozzles that no longer work.

The present invention proposes at least partially remedying the abovementioned drawbacks by providing a solution which is simple to realize and inexpensive and which can be adapted to a large number of wiper arms, in particular without modifying the design of the latter. In addition, the possibility of rapid, easy and inexpensive replacement in the event of a fault is also desirable.

To this end, one subject of the invention is a washing fluid spray device for a wiper arm for a system for wiping a window of a motor vehicle, characterized in that it comprises a cowling intended to cover one end of a wiper arm and also a washing fluid spray nozzle that is held in a removable manner by the cowling.

Thus, by virtue of the cowling and of the spray nozzle incorporated into the cowling, replacement can be carried out easily in the event of a fault. In addition, a large number of wiper arm types can be equipped easily with a washing fluid spray device.

The spray device according to the invention can also have one or more of the following features on their own or in combination:

According to one aspect, the cowling comprises means for snap-fastening to the end of the arm.

In another aspect, the entire internal volume of the cowling is of substantially the same shape as the outer shape of the end of the arm, the end of the arm being considered the end portion of the arm receiving a fixing device of the wiper blade.

Advantageously, the end of the wiper arm is in the form of a yoke.

According to another aspect, the cowling comprises two external side walls and at least one internal wall, said at least one internal wall delimiting with one of the external side walls a housing that receives the spray nozzle.

Advantageously, the cowling comprises two internal walls that delimit with the two external side walls two housings that each receive a spray nozzle so as to spray the washing fluid on either side of the squeegee blade.

The cowling may comprise protuberances for holding the spray nozzle by shape cooperation.

The spray nozzle is for example in the form of a spraying base and of a washing fluid dispensing cover, the base being fixed to the cover.

Alternatively, the spray nozzle is in one piece.

According to yet another aspect, the spray nozzle has a plurality of nozzles for forming a washing fluid spray fan.

The device preferably has a means for heating the spray nozzle, of the thermistor or resistor type with a positive temperature coefficient.

The invention also relates to a wiper arm for a system for wiping a window of a motor vehicle, characterized in that it comprises a spray device as defined above.

Finally, the invention relates to a wiping system comprising a wiper arm as defined above.

Figure 2:
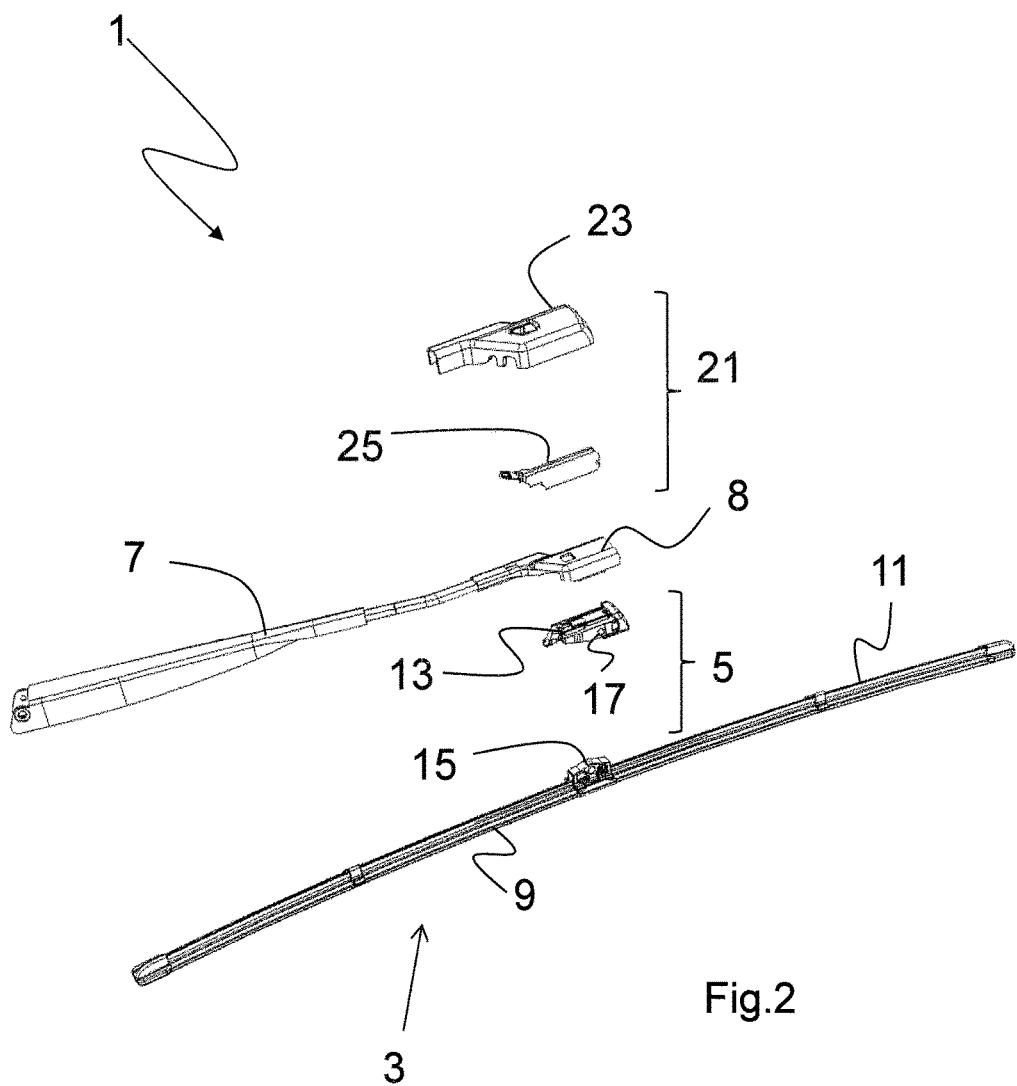
Figure 7:
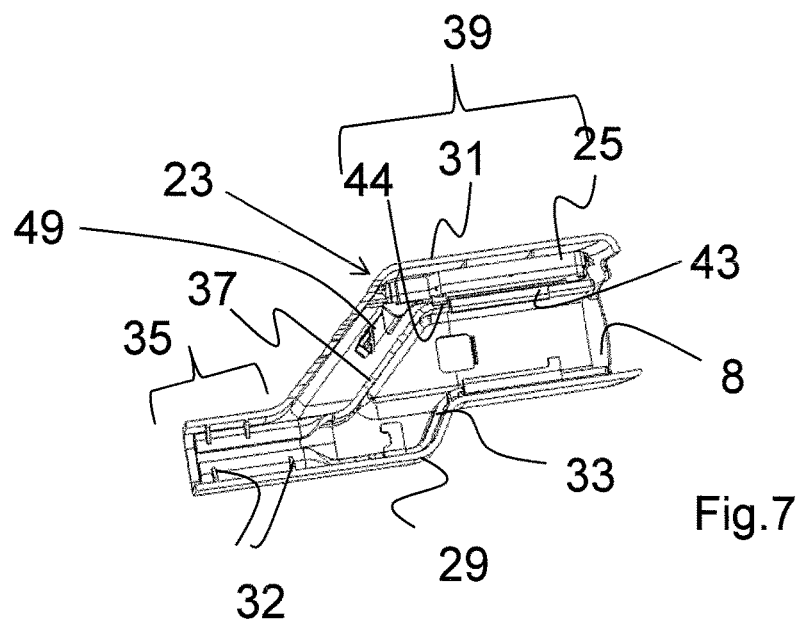
Figure 8:
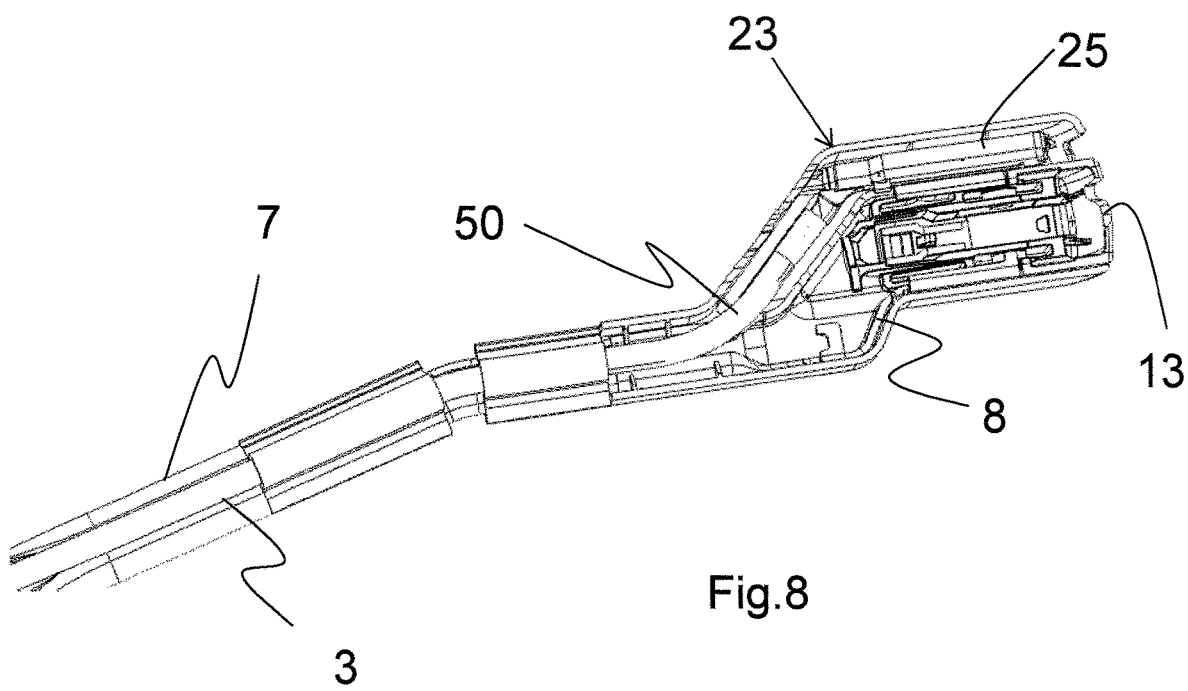

Further advantages and features will become apparent from reading the description of the invention and from the appended drawings, in which:

FIG. 1 is a perspective view of one embodiment of a wiper arm according to the invention, FIG. 2 is an exploded perspective view of the arm from FIG. 1, FIG. 3 is a bottom view of a cowling of a wiper arm from FIGS. 1 and 2, FIG. 4 is a perspective view of a spray nozzle of a wiper arm from FIGS. 1 and 2, FIGS. 5A and 5B are perspective views of elements that form the spray nozzle, FIG. 6 is a bottom view of a cowling and of a spray nozzle fitted on a wiper arm from FIGS. 1 and 2, FIG. 7 is a bottom view of a cowling with an incorporated spray nozzle fitted on a wiper arm yoke, FIG. 8 is a bottom view of a wiper arm from FIGS. 1 and 2 without an adapter and a wiping blade.

An exemplary embodiment will now be described with reference to the figures.

In all the figures, the same elements bear the same references.

The following embodiments are examples. Although the description refers to one or more embodiments, this does not necessarily mean that each reference relates to the same embodiment, or that the features apply only to one single embodiment. Individual features of various embodiments may also be combined to provide other embodiments.

The terms "top" and "bottom" are used in the common meaning when a windscreen wiper is installed on a vehicle. The face of the wiper arm that is next to a windscreen to be wiped is considered to be the bottom face and the face of the wiper arm that is away from the windscreen is the top face.

FIGS. 1 and 2 show a wiping device 1 or windscreen wiper comprising a wiper 3, a fixing device 5 and a wiper arm 7 that has, at one end, a support yoke 8 that is connected to the wiper 3 by the fixing device 5.

The wiper 3 comprises in particular a squeegee blade 9 or wiping blade and one or more vertebrae 11, in the present case one vertebra 11 in the form of a metal blade, giving the wiper 3 a curve that allows it to be applied correctly to a windscreen. The wiper 3 can also comprise a deflector and/or end pieces that hold in particular the squeegee blade 9 and the vertebra/vertebrae 11 together.

The fixing device 5 comprises an adapter 13 carried by the wiper arm 7 and also a connector 15 fixed to the wiper 3 without degrees of freedom.

The connector 15 is articulated so as to pivot on a pin 17 on the adapter 13 carried by the wiper arm 7.

The connector 15 is fixed to the wiper 3 without degrees of freedom, for example by two symmetrical flanges which sandwich the wiper 3 in the region of the vertebra 11 of the wiper 3.

The wiper arm 7 is equipped with a washing fluid spray device 21.

This spray device 21 comprises a cowling 23 that covers the support yoke 8 and also a washing fluid spray nozzle 25 that is held in a removable manner by the cowling 23. Both the cowling 23 and the spray nozzle 25 are produced for example from plastics material.

The structure of the cowling 23 is clearly visible in a bottom view in FIG. 3. The cowling 23 comprises in particular means 27 for snap-fastening to the support yoke 8. The cowling 23 is sized to fit over the end 8 of the wiper arm 7, that is to say that the entire internal volume of the cowling 23 has substantially the same shape as the outer shape of the end 8 of the wiper arm 7, the end of the arm 8 is considered as part of the arm receiving the fixing device 5 of the blade 3.

More specifically, the cowling 23 comprises two external side walls 29 and 31.

The external side wall 29 matches the shape of a first side wall 33 of the support yoke 8 and has at least one first, in the present case four first snap-fastening members 32 which attach to the side wall 33 of the support yoke 8.

In a first, narrowed portion 35, the external side wall 31 matches the shape of a second side wall 37 of the support yoke 8, opposite the first 33, and is then spaced apart from this side wall 37 so as to end in a second, widened portion 39 which is parallel to the second side wall 37 of the support yoke 8 and wider than the latter, so as to form a housing 41 for the spray nozzle 25.

In order to be coupled to the second side wall 37 of the support yoke 8, the cowling 23 comprises, in the region of the second, widened portion 39, an internal wall 43 that has at least one second snap-fastening member 44 that engages with the second side wall 37 of the support yoke 8.

This internal wall 43 delimits the housing 41 receiving the spray nozzle 25 in the second, widened portion 39.

It will thus be understood that the cowling is fixed to the support yoke 8 simply by snap-fastening and can be detached therefrom by overcoming the retention forces of the snap-fastening means 27.

The spray nozzle 25 is shown in more detail in FIGS. 4 and 5A and 5B.

The spray nozzle 25 has a parallelepipedal overall shape.

It is made in two parts, a spraying base 25A and a dispensing cover 25B that are joined together for example by adhesive bonding or welding, in particular ultrasonic welding.

The external faces 45A and 45B of the spray nozzle 25 can be seen in FIG. 4, while FIG. 5A shows the internal face 47A away from the face 45A and intended, in the assembled state, to face an internal face 47B shown in FIG. 5B, this face 47B being away from the external face 45B.

As can be seen in FIGS. 4 and 5A, a supply cannula 49 is made in one piece with the part 25A of the spray nozzle 25 and opens through an opening 51 onto the internal face 47A. The supply cannula 49 is connected to a supply pipe 50.

In the assembled state, the opening 51 is located next to a washing fluid dispensing groove 53 made in the internal face 47B of the part 25B of the spray nozzle 25.

On the internal face 47A of the spray nozzle 25, spraying grooves 55, of which there are 5 in the present case, originate at a location which will be next to the dispensing groove 53 so as to be supplied with washing fluid by the latter, and end at through openings 59 that form spraying nozzles, for example on the opposite short sides and on the bottom long side of the spray nozzle 25. The nozzles 59 make it possible to form a washing fluid spray fan in order to spray the washing fluid along practically the entire length of the squeegee blade 9.

The spray nozzle 25 is held in the housing 41 by ribs 67 carried on the wall 31 of the cowling 23, said ribs 67 pushing the spray nozzle 25 against the internal wall 43, and also by a protuberance 69 on the cowling 23, said protuberance 69 being accommodated by shape cooperation in a notch 71 disposed on one of the short sides of the spray nozzle 25.

In order to allow the washing fluid to be sprayed a fairly long way, the cowling 23 has a first 73 and a second 75 cutout in the side wall 31, said cutouts being in line with the spray nozzle 25, and thus being spraying nozzles.

FIG. 6 shows the spray nozzle 25 incorporated in the housing 41 by being snap-fastened in the cowling 23. It will thus be understood that the spray nozzle 25 can easily be fitted in and removed from the cowling 23, for example for maintenance.

FIG. 7 shows a bottom view of the assembly in FIG. 6, that is to say the cowling 23 with the incorporated spray nozzle 25, fitted on the support yoke 8.

FIG. 8 shows a bottom view of the assembled state of the wiper arm 7 with the support yoke 8 and the adapter 13, and also the cowling 23 and the spray nozzle 25.

It will thus be understood that the spray device formed by the cowling 23 and the incorporated spray nozzle 25 can be adapted easily to any kind of wiper arm.

On account of its snap-fastening means 27, it can be fitted and removed easily, for example for maintenance or replacement.

In addition, the spray nozzle 25 is well protected inside its housing 41 and is not directly sprayed with dirt which could clog the spraying nozzles. This is important in particular when the vehicle is stopped for a long time in the rain.

Of course, the invention is not limited only to the exemplary embodiments mentioned. The spray device may also comprise two spray nozzles 25, each of the spray nozzles 25 being received in a housing 41 in the cowling 23. In order to avoid the situation in which the spray nozzle(s) 25 suffer from the consequences of low temperatures, which could freeze the nozzles 59, provision can be made for the device to have a means for heating 99 the spray nozzle(s), it being possible for this heating means to be realized by thermistors or resistors with a positive temperature coefficient.

The invention claimed is:

1. A wiper arm for a system for wiping a window of a motor vehicle, comprising:

a longitudinal free end of the wiper arm configured to connect to a wiper blade via a fastening arrangement, the longitudinal free end of the wiper arm comprising an external face and an internal face, the internal face being configured to receive the fastening arrangement; and a washing fluid spray device comprising:
a cowling having an external face and an internal face, the cowling covering, in a removable manner, the external face of the longitudinal free end of the wiper arm, and
a washing fluid spray nozzle extending between the external face of the longitudinal free end and the internal face of the cowling and wherein the external face of the longitudinal free end is substantially parallel to the internal face of the cowling.

2. The wiper arm according to claim 1, wherein the cowling comprises snap-fastening members which engage with the longitudinal free end of the wiper arm.

3. The wiper arm according to claim 1, wherein the cowling comprises two external side walls and at least one internal wall, said at least one internal wall delimiting with one of the external side walls a housing that receives the spray nozzle.

4. The wiper arm according to claim 3, wherein the cowling comprises two internal walls that delimit, with the two external side walls, two housings that each receive a spray nozzle so as to spray the washing fluid on either side of the wiper blade.

5. The wiper arm according to claim 3, wherein the at least one internal wall comprises a portion that is parallel to at least one of the two external side walls, in a longitudinal direction of the wiper arm.

6. The wiper arm according to claim 1, wherein the cowling comprises protuberances for holding the spray nozzle by shape cooperation.

7. The wiper arm according to claim 1, wherein the spray nozzle is in the form of a spraying base and of a washing fluid dispensing cover, the base being fixed to the cover.

8. The wiper arm according to claim 1, wherein the spray nozzle is in one piece.

9. The wiper arm according to claim 1, wherein the spray nozzle has a plurality of nozzles for forming a washing fluid spray fan.

10. The wiper arm according to claim 1, wherein the washing fluid spray device comprises a means for heating the spray nozzle.

11. The wiper arm according to claim 1, wherein the cowling is sized to fit the longitudinal free end of the wiper arm.

12. The wiper arm according to claim 1, wherein the longitudinal free end comprises a lateral protrusion extending from a side of the wiper arm.

13. The wiper arm of claim 1, wherein the longitudinal free end of the wiper arm comprises a rectangular extension including an upper surface and four side walls.

14. The wiper arm according to claim 1, wherein the longitudinal free end of the wiper arm has a U-shaped cross section comprising two sidewalls connected by a horizontal upper wall, the washing fluid spray nozzle is positioned longitudinally on one of the two sidewalls of the longitudinal free end of the wiper arm.

15. A wiping system for wiping a window of a motor vehicle, the wiping system comprising:
a wiper arm comprising:
a longitudinal free end having an external face and an internal face, and
a washing fluid spray device comprising:
a cowling having an external face and an internal face, the cowling covering in a removable manner, the external face of the longitudinal free end of the wiper arm, and
a washing fluid spray nozzle extending between the external face of the longitudinal free end and the internal face of the cowling;
a wiper blade; and
a fastening arrangement that pivotally attaches the wiper blade to the wiper arm at the longitudinal free end of the wiper arm,
wherein the internal face of the longitudinal free end is configured to receive the fastening arrangement and wherein the external face of the longitudinal free end is substantially parallel to the internal face of the cowling.

16. The wiping system of claim 15,
wherein the longitudinal free end of the wiper arm mechanically engages with the fastening arrangement, and
wherein the cowling covers the longitudinal free end of the wiper arm engaged with the fastening arrangement.

17. The wiping system of claim 16, wherein the cowling is sized to fit the longitudinal free end of the wiper arm.

18. The wiping system according to claim 15,
wherein the cowling comprises two external side walls and at least one internal wall, said at least one internal wall delimiting with one of the external side walls a housing that receives the spray nozzle, and
wherein the at least one internal wall comprises a portion that is parallel to at least one of the two external side walls, in a longitudinal direction of the wiper arm.

* * * * *